(12) United States Patent
Lander

(10) Patent No.: US 7,228,497 B2
(45) Date of Patent: Jun. 5, 2007

(54) SYSTEM AND METHOD FOR AUTOMATED GENERATION OF XML TRANSFORMS

(75) Inventor: Richard Eric Lander, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 330 days.

(21) Appl. No.: 10/805,045

(22) Filed: Mar. 19, 2004

(65) Prior Publication Data

US 2005/0210374 A1    Sep. 22, 2005

(51) Int. Cl.
    *G06F 15/00* (2006.01)
(52) U.S. Cl. .............. 715/513; 715/501.1; 715/517; 715/523; 715/524
(58) Field of Classification Search ............ 715/513, 715/517, 523, 524, 501.1, 533
    See application file for complete search history.

(56) References Cited

U.S. PATENT DOCUMENTS

| 6,507,857 B1 * | 1/2003 | Yalcinalp ............... 715/513 |
| 6,799,299 B1 * | 9/2004 | Li et al. ............... 715/513 |
| 2003/0037076 A1 * | 2/2003 | Bravery et al. ........... 707/517 |
| 2005/0050000 A1 * | 3/2005 | Kwok et al. ............. 707/1 |

OTHER PUBLICATIONS

Collard, M.L., "An Infrastructure to Support Meta-Differencing and Refactoring of Source Code," *Proceedings 18th IEEE International Conference on Automated Software Engineering*, Montreal, Quebec, Canada, Oct. 6-10, 2003, 377-380.

Gkoutos, G.V. et al., "A Resource for Transforming HTML and Molfile Documents to XML Compliant Form," *Internet J. of Chemistry*, 2001, 4(5), NIL-4—NIL-14.

MacVittie, L., "XSLT Editors," *Network Computing*, 2003, 14(18), 73-74.

Naylor, B., "Meta-Stylesheets for the Conversion of Mathematical Documents into Multiple Forms," *Annals of Mathematics and Artificial Intelligence*, 2003, 38(1-3), 3-25.

Tennison, J., "What's New in XSLT 2.0?" *Interchange*, 2003, 9(1), 22-30.

* cited by examiner

Primary Examiner—Stephen Hong
Assistant Examiner—David Faber
(74) Attorney, Agent, or Firm—Woodcock Washburn LLP

(57) ABSTRACT

XML transforms may be automatically generated by separating a standard process that can produce features of many transforms, and a variable process that is tailored to the features of a particular transform. The standard process can be reused with any number of variable processes, while variable processes and corresponding input files may be tailor-made for generating a particular transform. The combined processes operate on an input file to create an output transform. An input file contains any number of data patterns from a source file and the corresponding data patterns from a new file that the source file is to be converted into. The automated process can use the data from such an input file to create a legitimate transform. The input file can also include custom transforms that are pre-made for incorporation into an output transform.

11 Claims, 8 Drawing Sheets

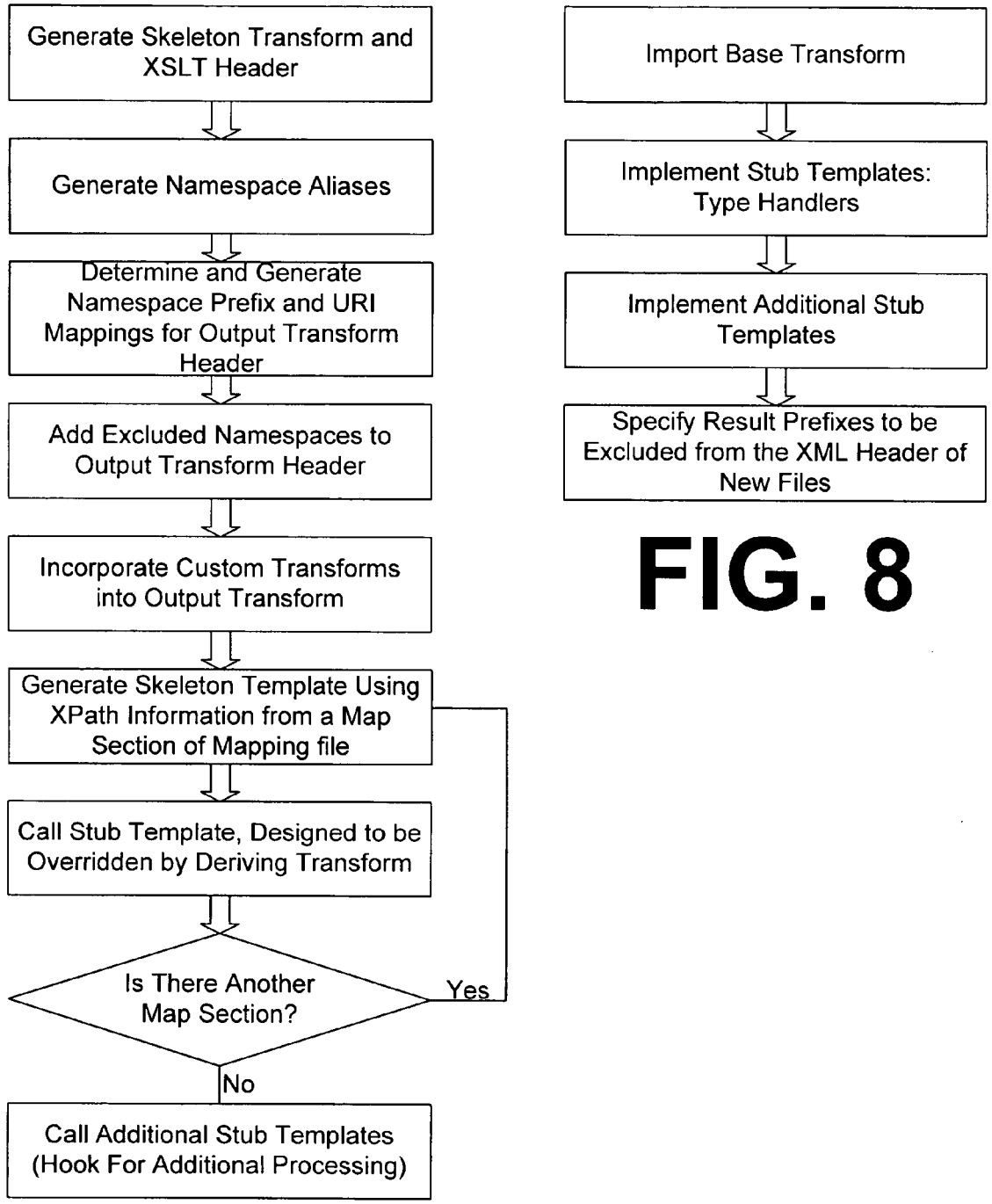

SYSTEM AND METHOD FOR AUTOMATED GENERATION OF XML TRANSFORMS

FIELD OF THE INVENTION

This invention relates to computing, and more specifically to transforming data from one format to another.

BACKGROUND OF THE INVENTION

Many computer users have experienced the problem of data stored in an inaccessible format. For example, a document stored in Portable Document Format (".pdf") made popular by ADOBE® may not be accessible from the popular MICROSOFT® WORD word-processing application. To view a document stored in .pdf format, a user must first acquire an appropriate application, such as the ADOBE® ACROBAT READER. Another familiar situation is that of accessible but scrambled or improperly formatted data. Some applications may attempt to make sense of documents designed for other applications, resulting in display of a document that does not look like the original, but is a scrambled combination of the original text and a set of strange characters.

One solution to the problem of inaccessible data is to transform the data into an accessible format. For example, one could write a program that transforms .pdf files into familiar .doc files, and then access the files using MICROSOFT® WORD. Many applications in use today offer a selection of file formats when saving data. This feature allows users to effectively transform their data into a format that will be useful for them when they access the files from other applications.

Transforming files from one format to another is commonplace in the context of data stored in an Extensible Markup Language ("XML") format. This is in part because the XML data format has experienced wide use. XML is quickly becoming the de facto standard for exchanging corporate data via structured documents, whether internally with business partners or via public applications across the Internet. The World Wide Web Consortium (W3C) has endorsed XML as the standard for document and data representation. With the proliferation of data stored in XML formats, the transformation of such data into formats that are recognized by diverse applications has also become widespread.

Another reason for the widespread necessity of transforming XML data arises from the extensible nature of the XML syntax. This syntax can be used to describe any arbitrary concept or tangible item. In other words, an architect can create an XML element called "skyscraper," a chemist can create "Bunsen burner" element, and a shipping company can create a "tractor trailer" element. Each of these professionals can then write programs that identify their own purpose-designed elements, and manipulate those elements according to their unique needs.

What happens when the architect joins a large architecture firm that uses an XML element identified as "big building" instead of "skyscraper"? The architect's programs will not work with the "big building" data generated by the large firm. Likewise, programs created by the large firm to identify "big building" elements will not recognize the architect's "skyscraper" elements. This is so even though the underlying data describing skyscrapers is represented in XML syntax, and it may be quite similar to the underlying data describing the firm's "big buildings." To use the architect's "skyscraper" data, the "skyscraper" identifiers must be changed to "big building." The underlying data tree, or structure of data, may also require transformation. If the architecture firm used some other program that did not support XML, there would be a need to transform the architect's data into some other format, e.g., .pdf, plain text, or Hyper-Text Markup Language ("HTML") format.

Because XML is extensible, the generation of unique element identifiers is widespread, leading to a correspondingly widespread need to generate uniquely tailored transforms for XML data. Moreover, writing a single transform that works for all XML data is impossible, because XML data is identified using an infinite variety of element identifiers, and a correspondingly infinite variety of data trees. New element identifiers and new tree structures are constantly created.

The widespread need to generate unique transforms to convert XML data into another format presents a problem that is exacerbated by the difficulty and tedium of the task. As one might imagine, writing transforms involves writing code that identifies every element in an XML file, and then re-identifies and reconfigures those elements into a format that is recognizable to a different schema or application. Such code must be properly written according to the need and the confines of the transformation language. Transforms of one XML document into another XML document, or some other data format, are generally performed using Extensible Stylesheet Language Transformations ("XSLT").

XSLT is an XML language that specifies rules to execute to transform one XML document to another. An XSLT document is called a stylesheet or transform (the terms are considered equivalent). An XSLT stylesheet contains templates. An XSLT processor compares the elements in an input XML document to the templates in a stylesheet. When it finds a matching template, it writes the template's contents into an output or resultant tree. When it completes this step, it may serialize the output tree further into an XML document or another format, such as plain text or HTML.

FIG. 1 displays the complete process of transforming a source file 101 into a new file 104. First, a developer 100 identifies the elements of the source file 101, and how those elements should be converted into elements of a new file 104. Next the developer 100 writes a transform 102, in the form of an XSLT stylesheet (discussed below). The transform 102 contains many general features that will be the same or similar for the vast majority of XSLT transforms. It also contains identifiers for information, such as namespaces, that will be used with either the source file 101, the transform 102 or the new file 104. Finally, it contains descriptions of particular types of source file data, and instructions for how to modify source file data to fit into a new file 104 format. A completed transform 102 can be used in an XSLT processor 103 to convert a source file 101 into a new file 104.

An XSLT processor 103 is a software program that reads an XSLT stylesheet such as transform 102, reads an input XML document such as source file 101, and converts the input document into an output document such as new file 104 according to the instructions given in the stylesheet. An XSLT processor 103 can be built into a web browser, it can be built into a web application or server, or it can be a standalone program run from the command line or a Graphic User Interface for an application.

The process of creating an XSLT stylesheet will usually involve writing an XML declaration for the stylesheet, which is a header section that describes the transform and specifies some required information, such as namespaces to be referenced in the transform. It will also involve writing a number of transform templates. Each template has a "match" attribute that contains a pattern identifying input that the template matches. The simplest such pattern is an element name. Thus, this template says that every time a person element is seen, the stylesheet processor should emit the text "A person":

```
<xsl:template match="person">A person</xsl:template>
```

The following is a complete stylesheet that uses the above template:

```
<?xml version = "1.0"?>
<xsl:stylesheet version = "1.0" xmlns:xsl =
http://www.w3.org/1999/XSL/Transform>
    < xsl:template match = "person">A person</xsl:template>
</xsl:stylesheet>
```

As can be appreciated from the very simple stylesheet above, there may be considerable difficulty and tedium in manually writing XSLT transforms, especially when transforms are for longer and more complex XML files. Moreover, many of the operations in generating such a stylesheet are repetitive: this refers to much of the information in the header, and the syntax within and surrounding the templates. In light of the pervasive need to transform XML data, the tedium and repetition involved in the task of writing XML transforms, and the lack of availability of a single transform that can be used with all XML data, there is an as-yet unaddressed need in the industry to improve techniques for creating XML transforms.

SUMMARY OF THE INVENTION

Various embodiments of the invention provide for automated generation of XML transforms by separating transform generation into a standard process that can produce features of many transforms, and a variable process that is tailored to the features of a particular transform. The standard process can be reused with any number of variable processes, while variable processes and corresponding input files may be tailor-made for generating a particular transform. A variable process may incorporate a standard process, leveraging an object-oriented approach to computer programming. The combined processes operate on an input file to create an output transform. An input file contains any number of data patterns from a source file and the corresponding data patterns from a new file that the source file is to be converted into. The automated process can use the data from such an input file to create a legitimate transform. The input file can also include custom transforms that are pre-made for incorporation into an output transform.

BRIEF DESCRIPTION OF THE DRAWINGS

FIG. 7 is a flowchart demonstrating processes that may be carried out by a base transform. Examples of these processes are provided in Appendix A.

FIG. 8 is a flowchart illustrating processes that may be carried out by a deriving transform. Examples of these processes are provided in Appendix B.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
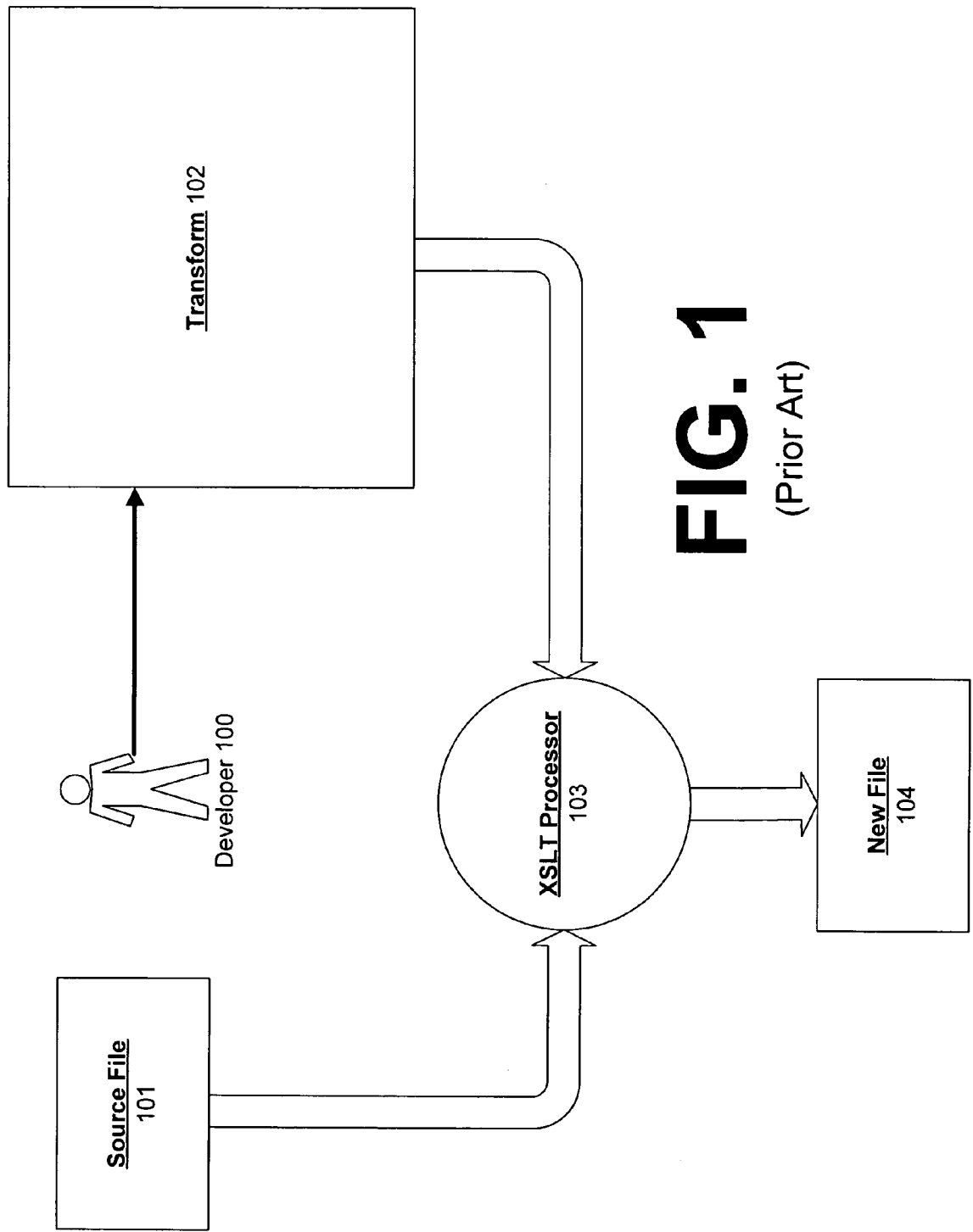
FIG. 1 illustrates the typical prior art method of writing and executing transforms. A developer writes a transform, the transform is executed by an XSLT processor, using a source file as input, to generate a new file.

In the figures corresponding to the following detailed description, identically identified elements relate to identical features. For example, the source file 101 in FIG. 1 may be considered to be the same source file 101 in FIG. 2. This is done for easy reference back and forth between the figures, and to help provide a greater context for the components in the figures.

Figure 2:
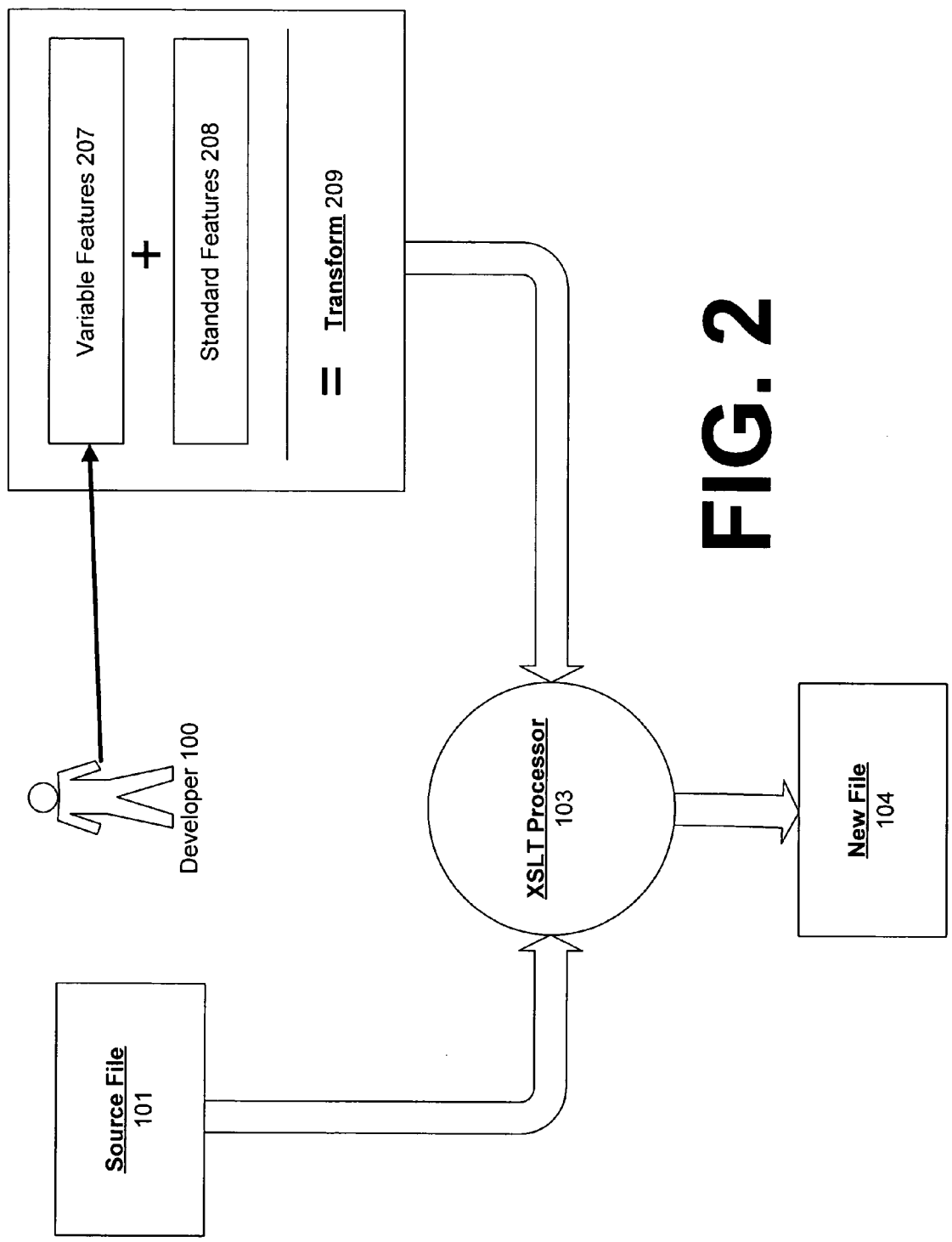
FIG. 2 illustrates a useful concept for understanding the various aspects of the invention. Transforms are usually made up of standard features common to many transforms, and variable features that are unique to specific transforms. A developer need only generate the unique features.

Overview of the Invention:

Various embodiments of the invention separate the variable features that are unique to individual transforms from the standard features that are shared by most transforms. This is illustrated in FIG. 2. FIG. 2 shows that a developer 100 may independently develop the variable features 207 that are unique to a particular transform 209, while a developer 100 need not independently develop the standard features 208.

Remaining with FIG. 2, the standard features 208 are common to many transforms, and may be developed at some earlier time, or may come from some source other than the developer 100 interested in generating a particular transform 209. By separating the variable features 207 of a transform 209 from the standard features 208 of a transform 209, redundancy in generating standard features 208 for a transform 209 can be reduced. As will be explained in greater detail, embodiments of the invention also provide intelligent techniques for defining and combining the variable features 207 and the standard features 208.

Figure 3:
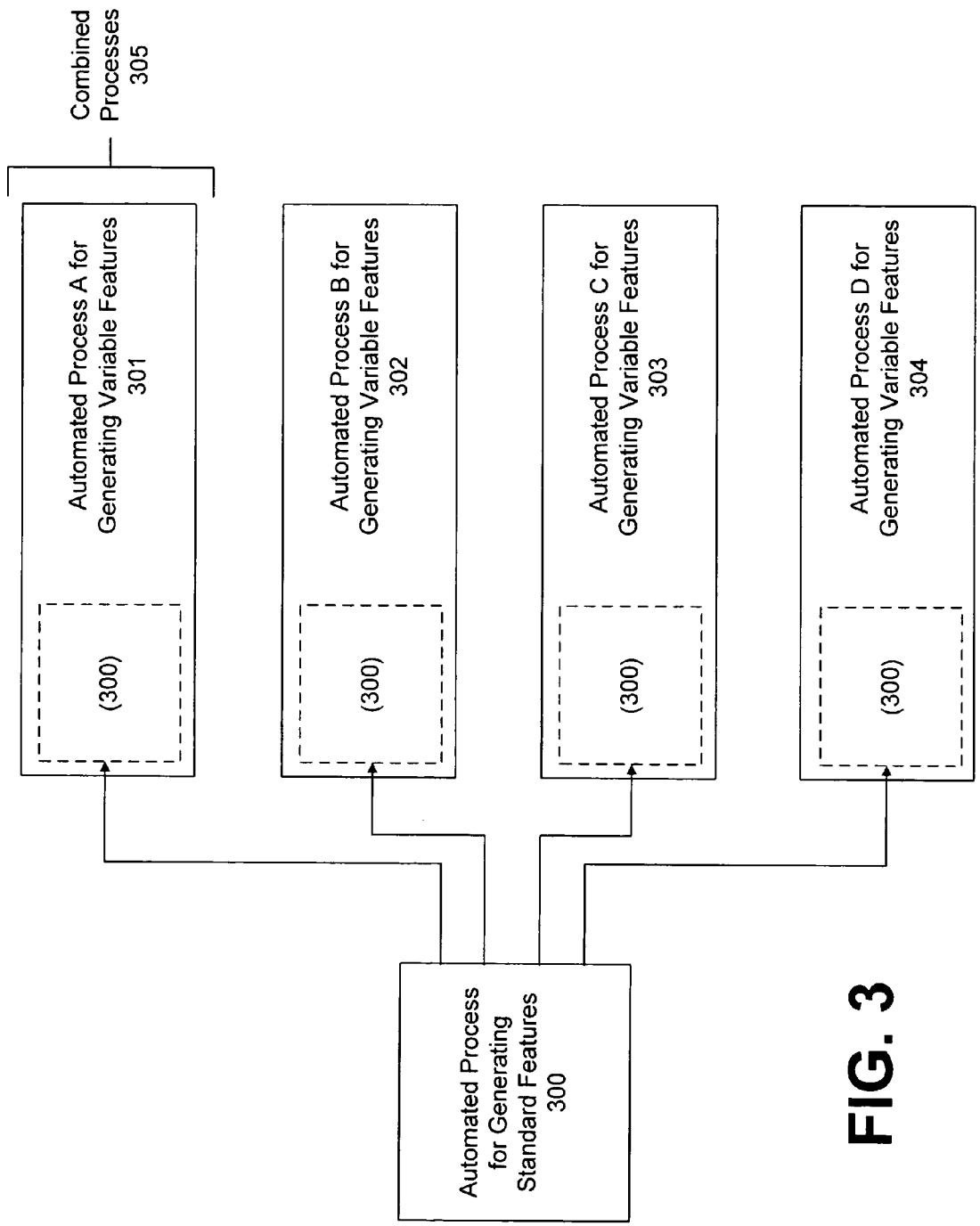
FIG. 3 displays an automated process for generating standard transform features that may be incorporated into one or more automated processes for generating variable transform features.

In various preferred embodiments, a developer 100 may achieve the savings inherent in developing only variable features 207 and not standard features 208 by automating the process of transform creation. This concept is demonstrated in FIG. 3. Instead of creating a set of standard features 208 and a set of variable features 207, in hopes of reusing the standard features 208, a developer 100 can create an automated process for generating standard features 300, and an automated process for generating variable features, such as 301, 302, 303, or 304. The automated process for generating standard features 300 may be referred to hereafter as the standard process 300, and while the automated process for generating variable features 301, 302, 303, or 304 may be referred to as the variable processes 301, 302, 303, or 304. The standard process 300 may be incorporated into subsequently created variable processes 301, 302, 303, and 304. Such incorporation is illustrated in FIG. 3 by the dashed-line boxes indicating element 300 inside the variable processes 301, 302, 303, 304. The combined variable and standard process will be referred to as the combined processes 305. Thus, by reusing a standard process 300, a developer 100 can save time in developing a transform.

The incorporation of a standard process 300 into one or more variable processes 301, 302, 303, and 304 leverages what is known as an object-oriented approach to computer programming. The one or more variable processes 301, 302, 303, and 304 can be described as one or more concrete transforms which derive from the automated process for generating standard features 300. This approach is similar to a well-understood model in which a base class derives from a concrete class in managed code.

Figure 4:
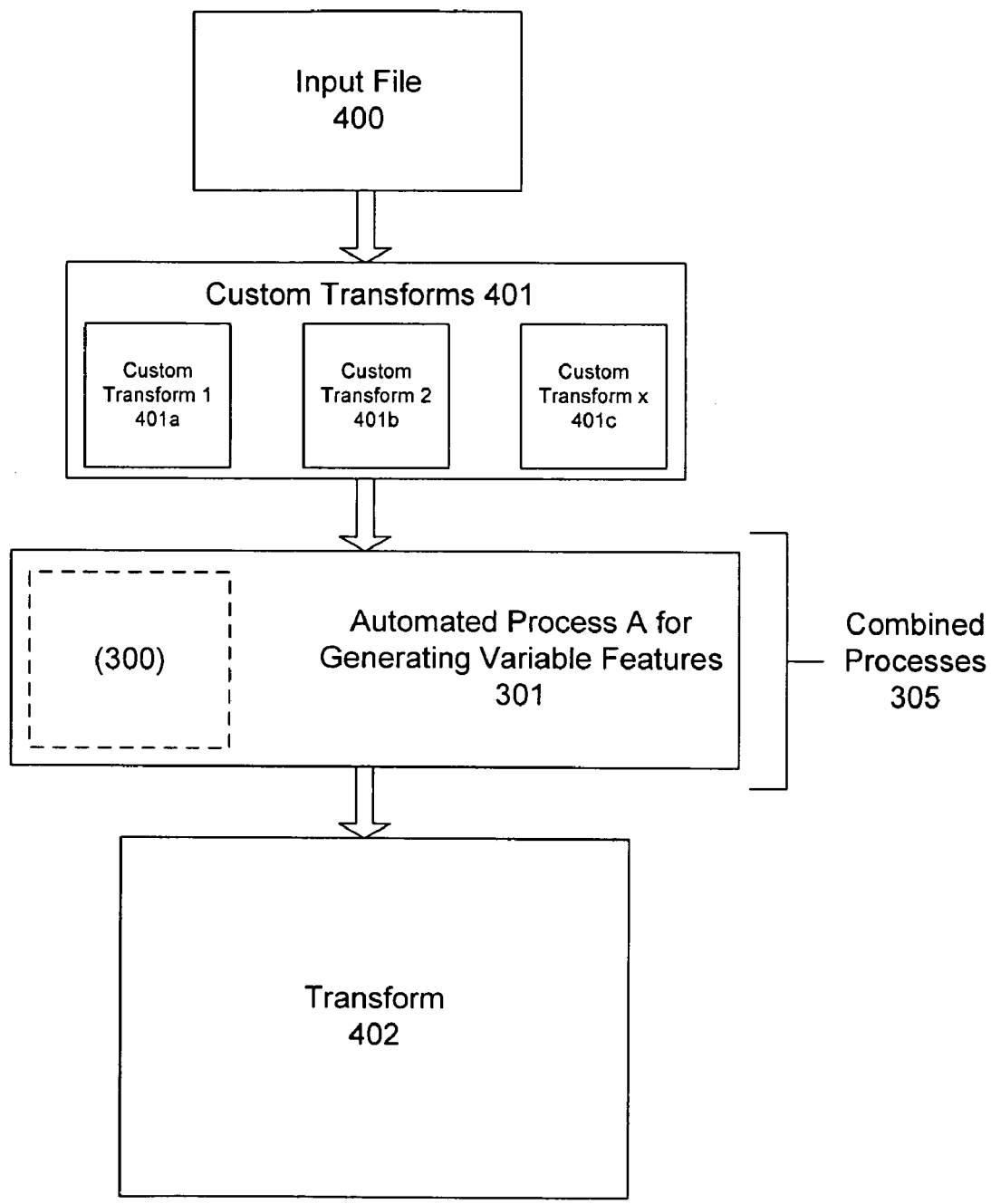
FIG. 4 illustrates the inputs and outputs of one exemplary automated process from FIG. 3. An input file and custom transforms may be operated on by such a process to generate a transform.

The generation of a transform using the combined processes 305 described in FIG. 3 can be carried out as illustrated in FIG. 4. Combined processes 305 have been imported into FIG. 4 from FIG. 3 to demonstrate the operation of one such automated process. In general, the combined processes 305 will receive an input and produce an output. In this regard, input file 400 and custom transforms 401, e.g., custom transform 1 401a, custom transform 2 401b, and custom transform 3 401c, can be provided to combined processes 305 as input, which then produces a transform 402 as its output. Input file 400 is a file that can be developed along with a variable process 301, in a way that is tailored to produce a desired transform 402 output. Techniques and examples for creating such an input file 400 will be explained below. Likewise, custom transforms 401 can be created as an input to the combined processes 305, and can be incorporated into the transform 402 output. Custom transforms 401 are an input that can be treated differently from the input file 400. In implementations where the custom transforms 401 are included in an input file 400, those transforms, referenced in that part of an input file 400, can be specially imported to an output transform 402. Because a standard process 300 and a variable process 301 can not always be expected to handle every possible input, such custom transform 401 inputs can be created, allowing the combined processes 305 to reference custom transforms 401 in the output transform 402 without performing the task of generating such custom transforms 401 from an input file 400.

Figure 5:
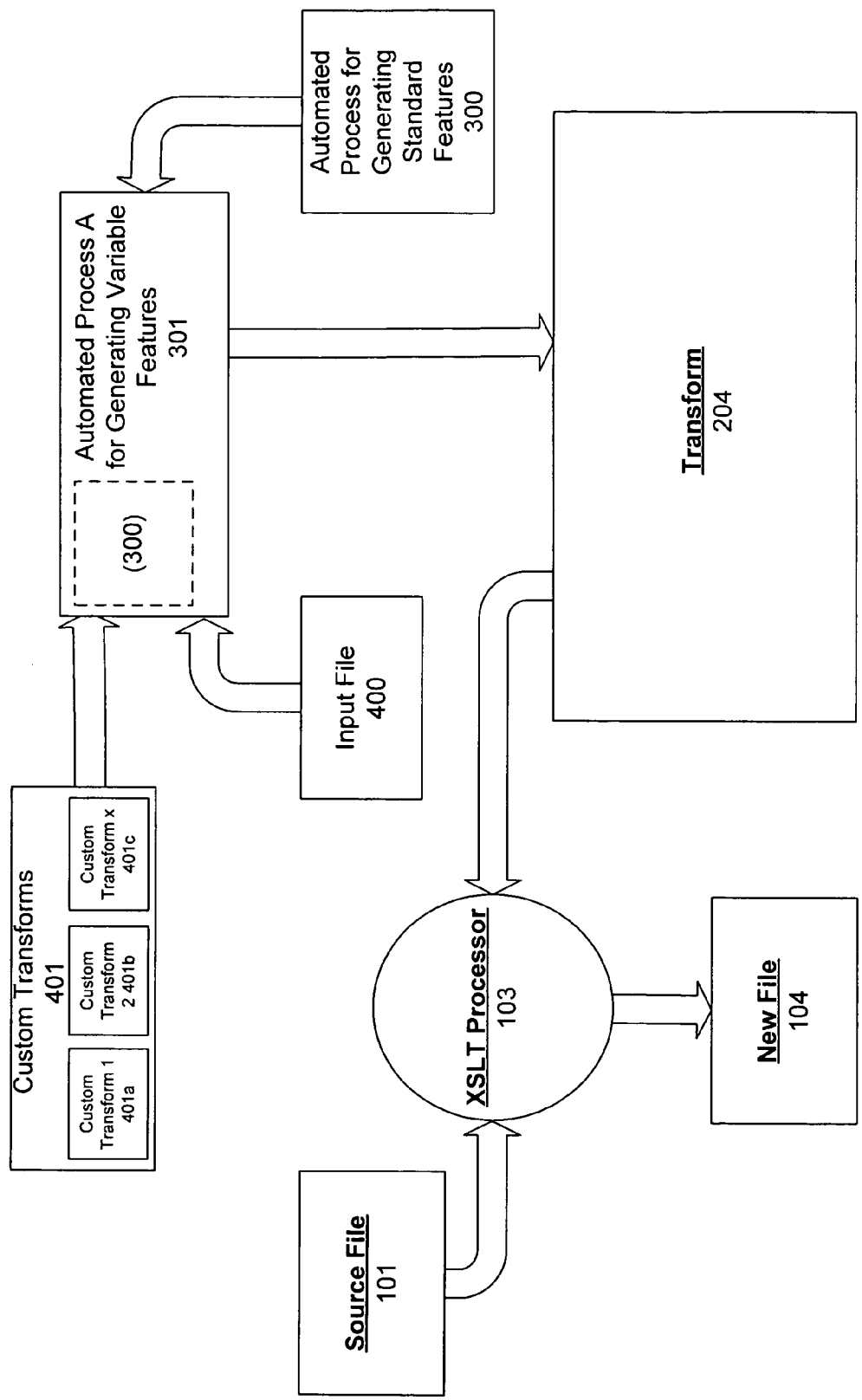
FIG. 5 illustrates a macroscopic view of embodiments of the invention in which a variable process incorporates a standard process, and then operates on an input file and any custom transforms to produce an output transform. This figure also shows the subsequent process for using the output transform with an XSLT processor to generate a new file.

FIG. 5 provides a complete framework for the generation and use of an XSLT transform 204 in accordance with the techniques and processes described above. FIG. 5 imports elements that will be recognized from earlier figures. As displayed in FIG. 5, a variable process 301 incorporates a standard process 300 for generating an output transform 204. Either the variable process or the standard process 301 may include a function to call in custom transforms 401. The combined processes 305 operate on an input file 400 to create an output transform 204. The output transform 204 can be used by an XSLT Processor 103 to operate on a source file 101, and transform the data therein, generating a new file 104. Elements of FIG. 5 that may be developed anew for a new transform are the custom transforms 401, the input file 400, and the variable process 301. The standard process 300 can be reused with any number of variable processes 301, facilitating the task of generating XSLT transforms 204.

Detailed Description of Various Embodiments

The following detailed description will step through the above overview of the invention and provide additional explanation of the concepts and features presented. In this regard, FIG. 2 illustrates dividing transforms into standard features 208 and variable features 207. When making such a division, the judgment and experience of those skilled in the art is the best guide. While it will be generally agreed that some features of transforms should certainly fall within the standard feature category, and other features should certainly be considered variable, there will also be many features that are not so easily categorized. The invention does not define a fixed set of features that should go into one category or the other. Indeed, various implementations of the invention may be designed that define standard and variable features differently according to the particular needs of a developer and the types of transforms a particular developer is often called to create.

There are, however, some guiding principles that should be accounted for when determining which features are standard and which are variable. First, consider the number of transforms to which the reusable standard process 300 will be available. It is desirable to accommodate a large number of transforms, while also eliminating as much redundancy as possible from the task of writing transforms. Second, consider the various types of XSLT processors that may be used with a standard process 300. There are many XSLT processors available, and a standard process 300 should create an output transform that can run on as many of such XSLT processors as possible. Third, consider the complexity of creating an input file 400. Because an input file 400 will be processed by the variable process 301, which includes the standard process 300, the input file will have to conform to a format that is usable by the standard process 300. It should be easy to create simple rules for the input file 400 that result in predictable transforms.

FIG. 2 also displays a developer 100 who develops the variable features 207 of a transform. In the more sophisticated embodiments of the invention, the developer 100 actually develops one or more variable processes 301, input files 400, and custom transforms 401. It should be made clear that a developer can be one or more human beings, organizations, businesses, or even automated processes. One developer may develop one aspect of the invention, such as the variable process 300, while another develops another aspect such as an input file 400. Because the standard process 300 can be used with many variable processes 301, 302, 303, and 304, it is expressly contemplated that a standard process 300 might be developed by a different entity than developer 100. However, this need not be the case, and all of the components of the invention may be created by the same entity.

FIG. 3 introduces the concept of a standard process 300 and variable processes 301, 302, 303, 304. It will be acknowledged that such automated processes can be implemented using any of a wide variety of techniques, including coding the processes in any number of computer programming languages. In this regard, the automated processes of FIG. 3 need not actually perform the functions of operating on an input file 400 and custom transforms 401, thereby generating an output transform 402. Instead, the automated processes may instruct a computer processor to perform such operations, in accordance with standard and accepted practices in the art.

Further with regard to the automated processes of FIG. 3, while those processes are represented as single processes for ease of illustration, they can just as easily be described and implemented as a number of discrete processes cooperating to perform the described function of the processes. This is typically referred to a modular program design or object-oriented programming. In this regard, a standard process 300 may actually comprise any number of supporting standard processes, any of which can be expressed or suppressed in accordance with the needs of a particular transform.

The standard process 300 may be alternatively referred to in this description as a base transform, or a base metatransform. As will be demonstrated, the use of this terminology is for the purpose of indicating a preferred embodiment of the invention, in which the particular standard process 300 is in fact a generalized transform, or XSLT stylesheet, that can be used by the variable process 301 to produce the standard features of a transform 402. This particular embodiment is illustrated in FIG. 6, which provides a complete framework much like that of FIG. 5, except using terminology that is more descriptive of a preferred embodiment of the invention.

Figure 6:
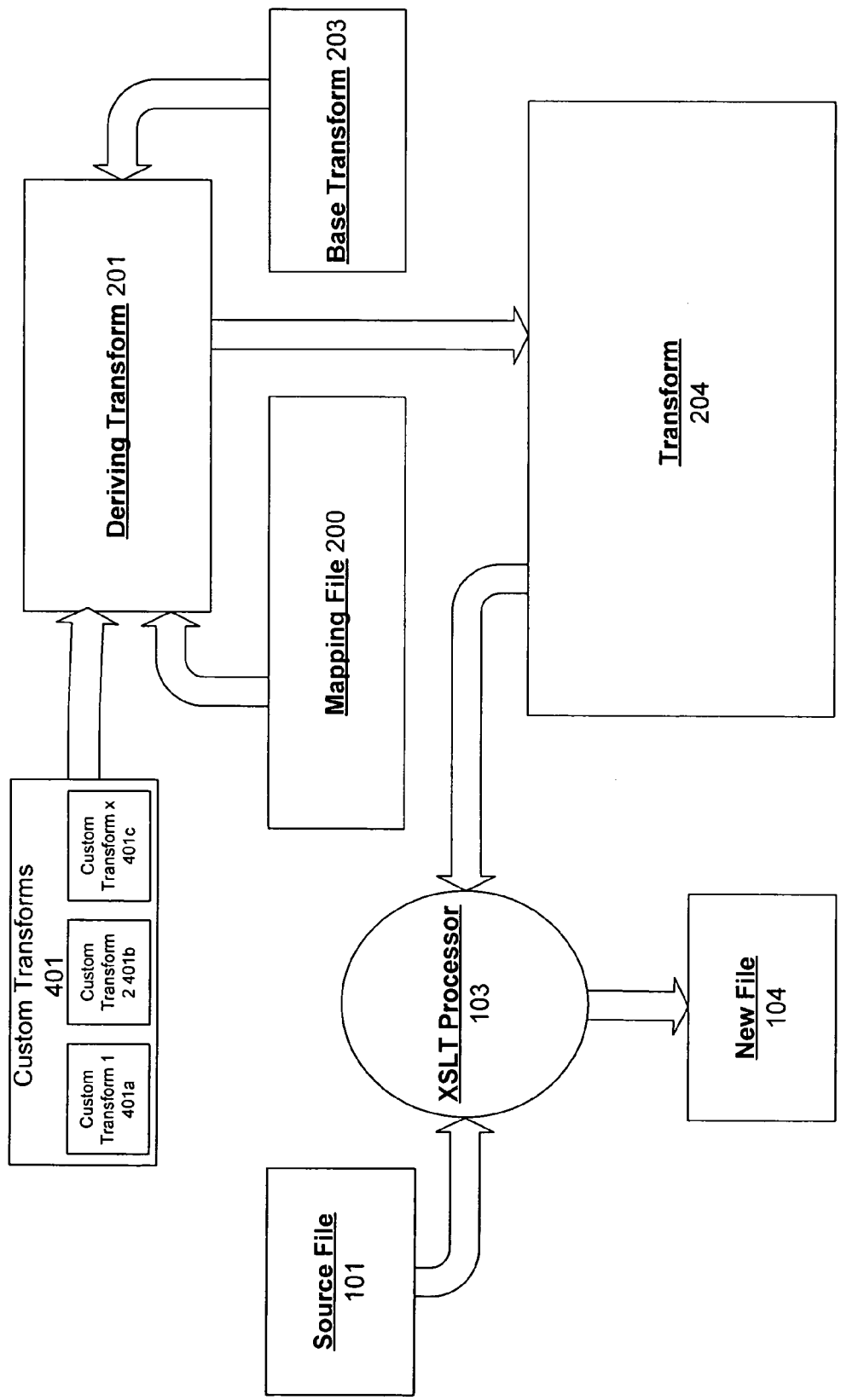
FIG. 6 illustrates various preferred embodiments of the invention in which the variable process is a deriving transform, the standard process is a base transform, and the input file is a mapping file.

In this regard, FIG. 6 illustrates the generation and use of an XSLT transform 204 in accordance with the techniques and processes described above. As displayed in FIG. 6, a deriving transform 201 incorporates a base transform 203. These will operate together to generate an output transform 204. Either the deriving transform 201 or the base transform 203 may include a function to call in custom transforms 401. The combined processes 201 operate on a mapping file 200 to create an output transform 204. The output transform 204 can be used by an XSLT Processor 103 to operate on a source file 101, and transform the data therein, generating a new file 104. Elements of FIG. 6 that may be developed anew for a transform 204 are the custom transforms 401, the mapping file 200, and the deriving transform 201. The base transform 203 can be reused with any number of deriving transforms 201, facilitating the task of generating XSLT transforms 204.

The Base Transform. An embodiment of base transform 203 process for use in an arrangement such as that of FIG. 6 is set forth in Appendix A. The processes of Appendix A, in conjunction with the comments inserted therein to add further explanation, will be apparent to those of skill in the art. The following brief description will point out some of the important concepts and advancements that have been developed for inclusion with such an implementation. In this regard, refer to the flowchart of FIG. 7. This flowchart shows steps that may be engaged in by a base transform 203. While the flowchart suggests a sequence for the steps, it is contemplated that this sequence can be changed to meet the individual needs of a particular implementation.

As displayed in FIG. 7, the base transform 203 can, in general, contain a process for generating the skeleton structure of transform 204, thereby eliminating as much of the redundant work in generating deriving transforms 201 as possible. This skeleton process can include a process for generating an XSLT header. It can also engage in namespace aliasing, or creation of a temporary namespace alias, for later conversion into a namespace associated with an actual XML file. This temporary namespace alias may also be referred to as a faux XSLT namespace.

Further, with reference to FIG. 7, the base transform 203 may read any namespace prefixes and Uniform Resource Identifiers ("URIs") from a mapping file 200. This information can be used to determine and generate namespace and prefix mappings for an output transform 204 header. The base transform 203 may also read a list of namespace and prefix references to exclude from such an output transform 204, and add them to the XSLT header of the generated transform 204. These namespace prefixes are excluded from an XML file that is the result of a transform by the generated transform 204.

The base transform 203 may also provide a function for incorporating the one or more custom transforms 401 into an output transform 402. As shown in Appendix A, this process may be implemented by providing a process for reading a list of custom transforms, if any, and subsequently importing such custom transforms 401 into an output transform 204.

The next series of steps in FIG. 7 show a process for generating the templates that make up the body of an XSLT transform. A base transform 203 may provide much of this body by operating on a mapping file 200 to provide features of XSLT templates. As will be explained further with regard to the mapping file 200, restrictions can be adopted for the content of an input file 200, so that any mapping file 200 that conforms to the restrictions may be used in conjunction with a particular base transform 203. When the aspects of the invention are used in this configuration, a base transform 203 can include a function for generating templates based on any number of sections in a mapping file 200 that define the appropriate information for an XSLT template. Each section of a mapping file 200 can be configured to contain match information, or descriptions of data patterns, that will be used for the templates of an output transform 204.

In this regard, the function in a base transform 203 for generating templates can include first generating a skeletal template. The base transform 203 may refer to a section of a mapping file 200 that contains a data pattern for use in this part of the process. Such a data pattern can be a single element from an XML file, or a number of such elements. A data pattern may also specify a sequence of XML elements, and/or attributes of XML elements. In various embodiments, the base transform 203 could refer to at least one XPath component in a mapping file 200 to determine a data pattern. XPath is a language used to identify particular parts of XML documents. XPath allows for expressions that reference elements both generically and specifically. XPath indicates "nodes" by position, relative position, type, content, and several other criteria. The use of XPath is common in XSLT transforms for selecting and matching particular elements in input documents, for example a source file 101, for copying into output files, e.g., new file 104, or for further processing. XPath expressions can be grouped in a mapping file 200, and those groups can make up a data pattern. A base transform 203 can use such data patterns to generate a skeletal XSLT template.

The base transform 203 may then provide for calling an abstract named template, or stub template. The call to such an abstract named template can be overridden by the deriving transform 201. In short, the call to a stub template can initiate a process whereby the deriving transform 201 provides a "type handler" for a particular type of template. The type handler may provide additional features for an output transform 204 that are not provided by a base transform 203. As the name indicates, a type handler may be designed for use with particular types of data. For example, it can be tailored to a particular new file 104 format. This process will be explained in greater detail with regard to the deriving transform 201, below. As FIG. 7 suggests, the process for generating templates for an output transform can be repeated for as many templates as necessary for the output transform 204.

Finally, the base transform 203 can include additional calls to additional stub templates. In the same manner as the above calls may be overridden to call type handlers, these additional calls may be overridden by the deriving transform 201 to call processes that provide any other additional features for the output transform 204. In the implementation of Appendix A, the additional call to a stub template is used as a hook for additional processing at the global level. When used in this way, it may be helpful to provide such additional stub template calls as a last process in the sequence of processes provided by a base transforms 203. As a result, any XML generated via this hook may be the last in the file.

The Deriving Transform. A deriving transform 201 may be designed to work with a base transform 203. This architecture is convenient for developers, because they can concentrate on producing code that is closest to their problem area, i.e., the variable features, while leaving the infrastructure of generating transforms to a base transform 203. Exemplary deriving transforms for use with embodiments of the invention as illustrated in FIG. 6 are provided in Appendix B. While those of skill in the art will appreciate the advancements presented in Appendix B, FIG. 8 is presented for the purpose of clearly demonstrating aspects and improvements related to these embodiments of the invention.

Because a deriving transform 201 is a deriving class, the scope of its function is, by definition, broader than that of a base transform 203. A deriving transform can, in theory, be designed to perform any function. It is only required to implement the abstract members of the base class—the base transform 203. While the invention is not limited to the specific features and functions of a deriving transform 201 provided here, the following description may be used as a reference for many of the useful features a deriving transform 201 may provide.

Referring to FIG. 8, a deriving transform 201 may import a base transform 203. At this point the purpose of such an import should be clear—the base transform 203 provides much of the standard processing work in generating an output transform 204. In the embodiments depicted in Appendix B and corresponding FIG. 8, the import of a base transform 203 may be conducted using an XSLT import mechanism. In other embodiments, any other technique for importing a base class into a deriving class may be used.

The deriving transform 201 may also implement the abstract named templates, or stub templates, generated by the base transform 203 as described in connection with FIG. 7 above. This implementation may be carried out by overriding the call initiated by the base transform to a stub template with a call to an actual template, or other process for generating a stylesheet template, also called a "type handler." There are various ways to accomplish the task calling a type handler. One way to do so, as suggested in Appendix B, is to make use of a simple choose statement, which tests for various mapping types in a source file 101 and then routes execution to type handlers which generate the proper XSLT code for those mapping types. Other possible techniques will be apparent to those of skill in the art.

Type handlers may be uniquely developed, as needed, for use in generating a transform 204. As shown in Appendix B, a type handler can be a template that generates the body of a transform 204. The type handlers are needed because different XSLT is needed for different types of output semantics. In other words, the type handlers may produce appropriate XSLT syntax for generating the features of a transform 204 responsible for formatting the data of a new file 104. They will typically be designed for use with a particular mapping file 200, as described below. Each type handler called will naturally generate an appropriate template to transform data from a source file 101 into new file 104 data, based on the information in a mapping file 200.

As indicated in FIG. 8 and suggested in the discussion of FIG. 7, a deriving transform 201 may also implement any other another named template that overrides an abstract template in the base transform 203. This feature of the invention can be used for additional processing to create arbitrary XSLT code.

Finally, a deriving transform 201 can specify any result prefixes to be excluded from the XML header of files that are the result of a transform of the generated XSLT—i.e., new file 104. As discussed with reference to FIG. 7, the base transform 203 may perform the function of reading the specified namespace prefix and URI information and performing the mechanics of excluding them.

The Mapping File. A mapping file 200 is one embodiment of an input file 400 for use with embodiments of the invention illustrated in FIG. 6. A mapping file 200 can contain any number of data patterns from a source file 101, and the corresponding data patterns from a new file 104 that the source file 101 is to be converted into. The mapping file 200 can be designed to be used by a base transform 203 and a deriving transform 201 to generate an output transform 204. Exemplary mapping files are provided in Appendix C.

A mapping file 200 can be designed to meet any input requirements of both a base transform 203 and a deriving transform 201. In the embodiments illustrated in FIG. 6, a mapping file 200 may meet such requirements by conforming to a particular schema. The contents of a mapping file 200 can be "mappings," comprising lists of elements to match. In this way, the mappings describe a conversion between XPaths and any desired output semantic. This model for a mapping file has an advantage of great similarity to current XSLT content in which XPaths are mapped to a template implementation. Here, such mappings can be converted to XSLT template rules by a deriving transform 201 which incorporates a base transform 203.

Further with respect to mapping files, any mapping file 200 for use with embodiments such as that of FIG. 6 may have three components: custom transforms, namespace managers, and the mappings themselves. The custom transforms in a mapping file 200 are the same custom transforms 401 that that have been discussed previously. These custom transforms 401, though illustrated as a separate component in the figures, may be included in a mapping file 200 to streamline the input for the transform framework. They can be linked from the mapping file 200 into the output transform 204 via an XSLT import mechanism incorporated into a base transform 203.

An XML namespace manager component of a mapping file 200 can include a set of any namespace URI and prefix pairs that are needed for the output transform 204. When such a namespace manager component is used, the XPaths that are listed in the mapping file 200 can rely on the included prefix/URI pairs, because they will be added to the output transform 204.

The mappings component of the mapping file 200 should be clear from Appendix C. As shown there, such a mappings component may be composed of two main parts: XPaths and output semantics. These two parts correspond to the data format from a source file 101 and the data format for a new file 104. The XPaths can be as simple or as complicated as XPath allows: the whole of XPath is supported.

The output semantic may also be as simple or as complicated as desired. A preferred embodiment of the invention allows for an open-ended output semantic, allowing for inclusion of any XML to adequately describe a new file 104 format for an output transform 204. For example, in the case of a WordML transform, the Word style and its type (character or inline) can be included in the output semantic component. This part of the framework provides great flexibility, because there are no significant limitations on what output semantic may be specified other than the limitations inherent in XML.

Figure 9:
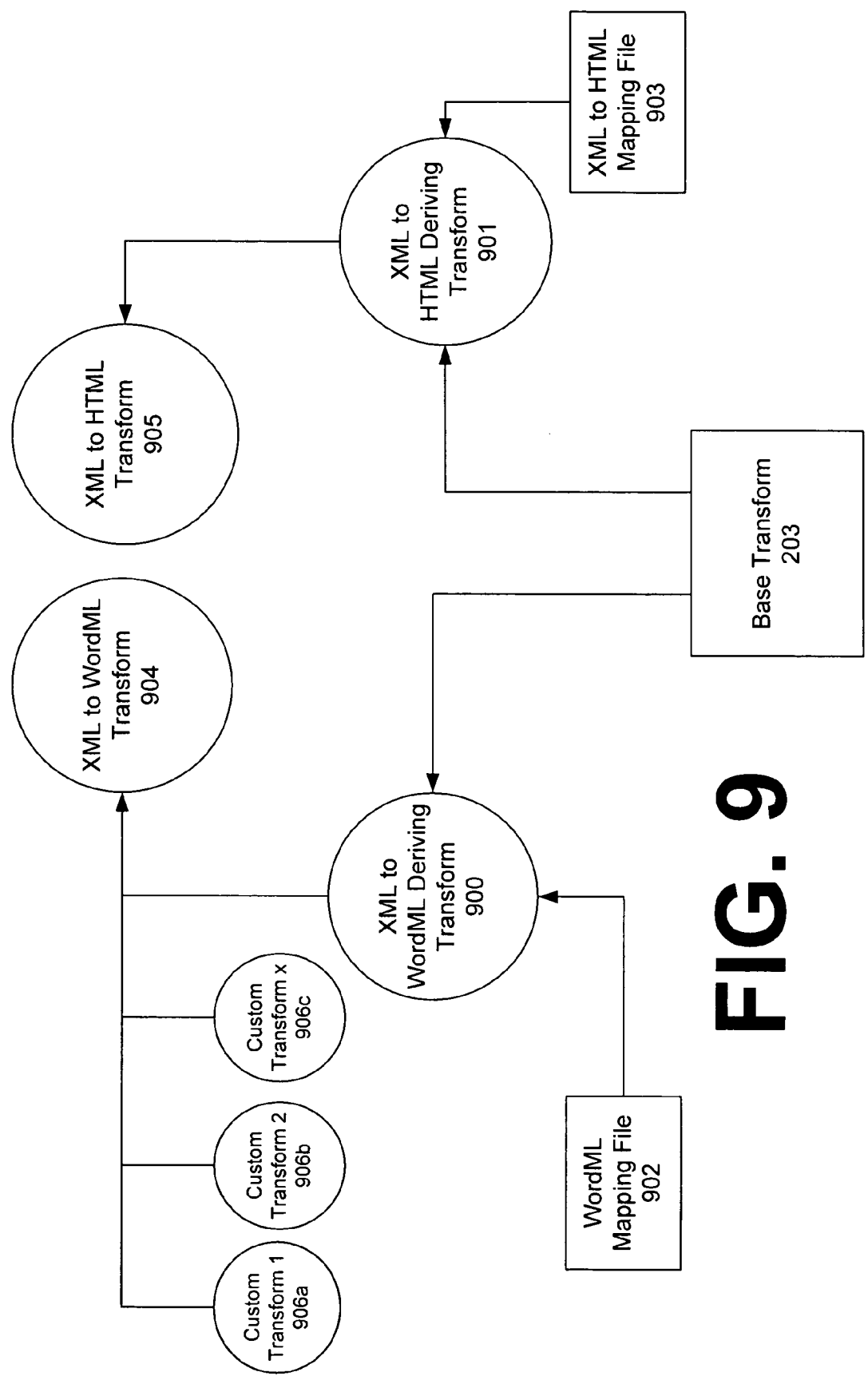
FIG. 9 shows a base transform being used with multiple deriving transforms and mapping files, which optionally import custom transforms, to produce various output transforms.

Combining the Base Transform, Deriving Transform, and Mapping File. FIG. 9 shows a combination of the components described above. FIG. 9 is similar to FIG. 5 and FIG. 6, except that FIG. 9 omits the operation of an XSLT processor on an output transform. Instead, FIG. 9 illustrates the flexibility of a base transform 203 and its corresponding availability for repeated use. FIG. 9 demonstrates a base transform 203 that is incorporated into multiple deriving transforms 900, 901. These deriving transforms are illustrated as an XML to WordML 900 and an XML to HTML 901 deriving transform, but the base transform 203 may also be used to generate transforms for any other type of deriving transform. The various potential deriving transforms and corresponding output formats are too numerous to mention here.

FIG. 9 shows custom transforms 906a, 906b, 906c that have been developed for the WordML output transform 904. Observe that there are no custom transforms have been created for the XML to HTML transform 905. Custom transforms will typically be used to handle logic that cannot be represented via the simple mapping file format. They need not be included in transforms that require no such logic. FIG. 9 illustrates this by omitting the use of custom transforms for the XML to HTML output transform 905. The custom transforms 906a, 906b, 906c for the WordML transform can be linked in via the XSLT "import" mechanism. Embodiments that take advantage of the "import" mechanism have the advantage of avoiding conflicts arising from duplicate template names, which can be the case, for example, when the "include" mechanism is used.

FIG. 9 also illustrates mapping files 902, 903. These can map XPaths to some output format semantic. In the case of the WordML mapping file 902, the output semantic can be, for example, a Word style. The output semantic can also be associated with a type handler from the deriving transform 900. The resultant transform 904 transforms XML to WordML. More specifically, XPaths are transformed into the appropriate WordML for the mapped Word style. The mapping files 902, 903 may also contain any result XML namespaces which may be required for a resultant transform 904, 905. The mapping files 902, 903 may also support importing custom transforms, e.g., 906a, 906b, 906c, which will can be represented as "xsl:import" statements in a generated transform 904, 905.

Moving now to the deriving transforms 900, 901 in FIG. 9, such a deriving transform may be conceptually similar to a deriving class (or subclass) that overrides certain functionality (as required or optionally) in a base class. Consider, for example, the WordML deriving transform 900. The WordML transform 900 may contain a set of type handlers for the various style types that exist in a mapping file 902. The WordML deriving transform 900 can route the style types from the mapping file 902 to the type handlers. In some implementations, such routing and subsequent processing by the type handlers may be the bulk of the deriving transform 900. Also, a deriving transform 900, 901 may include any additional functions, as necessary.

The base transform 203 of FIG. 9 is conceptually similar to a base class that both provides basic functionality and virtual methods that can be implemented in a deriving class. Such a base transform 203 can include a process for reading a mapping file 902, 903; to generate a skeleton output transform; and to route execution to a deriving transform 900, 901. The base transform 203 can be flexibly used with many deriving transforms 900, 901 by containing few assumptions. When used with a particular base transform 203 a mapping file 902, 903 may be configured to conform to any base transform 203 requirements.

The output transforms 904, 905 of FIG. 9 are proper, complete XSLT transforms. However, if desired, the processes described herein may be designed to produce transforms that require modification prior to use. The invention is not limited to the production of entirely finished, proper XSLT transforms, because embodiments could easily be designed to produce almost finished transforms that may be subsequently converted into a finished transform. The processes of FIG. 9 may be analogized to that of a compiler. The base transform 203, deriving transform 900, 901, mapping file 902, 903 and any custom transforms 906a, 906b, 906c can be "compiled" into an output transform 904, 905. The resultant transform, e.g., 904, can link in any custom transforms 906a, 906b, 906c whose logic was presumably too complicated for a mapping file 902. These can be linked in via an XSLT import mechanism, or using any other technique for inserting them into the output transform 904. For example one could alternatively import an output transform 904 into a custom transform 906a. Such approaches are considered to be in accordance with the techniques of the invention.

Finally, it should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the user interface techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes. Therefore, the present invention should not be limited to any single embodiment, but rather should be construed in breadth and scope in accordance with the appended claims.

What is claimed:

1. A method for automatically generating all or part of an Extensible Stylesheet Language Transforms ("XSLT") transform for transforming Extensible Markup Language ("XML") data in a source file format into data in a new file format, comprising:
    producing an input file comprising:
        an identification of a mapping relationship between at least one data pattern from an XML source file and at least one data pattern for a new file;
        at least one pre-designed custom XSLT transform; and
        at least one namespace manager comprising a Uniform Resource Identifier (URI) and namespace prefix pair; and
    producing first instructions for an automated process for generating an XSLT transform;
    wherein said first instructions for an automated process is designed to inherit second instructions for an automated process for generating said XSLT transform by containing a reference to said second instructions for an automated process that will cause control of a computer processor to pass from said first instructions for an automated process to said second instructions for an automated process;
    wherein said second instructions for an automated process places an XSLT header and a faux XSLT namespace into said XSLT transform;
    wherein said second instructions for an automated process places at least one namespace from said input file into said XSLT transform;
    wherein said second instructions for an automated process places said at least one pre-designed custom XSLT transform into said XSLT transform;
    wherein said second instructions for an automated process places content in a body section of said XSLT transform by utilizing said input file to identify a data pattern in a source file and a corresponding data pattern in a new file; and
    wherein said first instructions for an automated process override a call initiated by said second instructions for an automated process with a call to a portion of said first instructions for an automated process for generating at least one feature of said XSLT transform.

2. The method of claim 1, wherein at least one XPath expression is used to identify said mapping relationship between at least one data pattern from an XML source file and said at least one data pattern from said new file.

3. The method of claim 1, wherein said second instructions for an automated process is an XSLT transform.

4. The method of claim 1, wherein said content in a body section of said XSLT transform comprises at least one XSLT template corresponding to the at least one data pattern from said XML source file.

5. The method of claim 1, wherein said input file conforms to an XML schema.

6. The method of claim 1, wherein said first instructions for an automated process comprise an identification of at least one namespace to exclude from said new file.

7. A computer readable medium with computer-readable instructions stored thereon for automatically generating all or part of an Extensible Stylesheet Language Transforms ("XSLT") transform for transforming Extensible Markup Language ("XML") data in a source file format into data in a new file format, said instructions comprising:
    instructions for producing an input file comprising:
        an identification of a mapping relationship between at least one data pattern from an XML source file and at least one data pattern for a new file;
        at least one pre-designed custom XSLT transform; and
        at least one namespace manager comprising a Uniform Resource Identifier (URI) and namespace prefix pair; and
    instructions for producing first instructions for an automated process for generating an XSLT transform;
    wherein said first instructions for an automated process is designed to inherit second instructions for an automated process for generating said XSLT transform by containing a reference to said second instructions for an automated process that will cause control of a computer processor to pass from said first instructions for an automated process to said second instructions for an automated process;
    wherein said second instructions for an automated process places an XSLT header and a faux XSLT namespace into said XSLT transform;
    wherein said second instructions for an automated process places at least one namespace from said input file into said XSLT transform;
    wherein said second instructions for an automated process places said at least one pre-designed custom XSLT transform into said XSLT transform;
    wherein said second instructions for an automated process places content in a body section of said XSLT transform by utilizing said input file to identify a data pattern in a source file and a corresponding data pattern in a new file; and
    wherein said first instructions for an automated process override a call initiated by said second instructions for an automated process with a call to a portion of said first instructions for an automated process for generating at least one feature of said XSLT transform.

8. The computer readable medium of claim 7, wherein at least one XPath expression is used to identify said mapping relationship between said at least one data pattern from an XML source file and said at least one data pattern from said new file.

9. The computer readable medium of claim 7, wherein said second instructions for an automated process is an XSLT transform.

10. The computer readable medium of claim 7, wherein said content in a body section of said XSLT transform comprises at least one XSLT template corresponding to the at least one data pattern from said XML source file.

11. The computer readable medium of claim 7, wherein said first instructions for an automated process comprise an identification of at least one namespace to exclude from said new file.

* * * * *